(12) United States Patent
van der Padt et al.

(10) Patent No.: US 8,940,167 B2
(45) Date of Patent: Jan. 27, 2015

(54) SPIRAL WOUND FILTER ASSEMBLY

(75) Inventors: Albert van der Padt, Apeldoorn (NL); Tjeerd Jongsma, Bennekom (NL)

(73) Assignee: Friesland Brands B.V., Meppel (NL)

( * ) Notice: Subject to any disclaimer, the term of this patent is extended or adjusted under 35 U.S.C. 154(b) by 1014 days.

(21) Appl. No.: 12/666,741

(22) PCT Filed: Jun. 30, 2008

(86) PCT No.: PCT/NL2008/050439
§ 371 (c)(1),
(2), (4) Date: Jan. 12, 2010

(87) PCT Pub. No.: WO2009/005350
PCT Pub. Date: Jan. 8, 2009

(65) Prior Publication Data
US 2010/0326910 A1 Dec. 30, 2010

(30) Foreign Application Priority Data
Jun. 29, 2007 (EP) .................................. 07111450

(51) Int. Cl.
*B01D 63/00* (2006.01)
*C02F 1/44* (2006.01)
*B01D 63/10* (2006.01)
*B01D 63/12* (2006.01)
*B01D 65/08* (2006.01)

(52) U.S. Cl.
CPC .............. *B01D 63/106* (2013.01); *B01D 63/10* (2013.01); *B01D 63/103* (2013.01); *B01D 63/12* (2013.01); *B01D 65/08* (2013.01); *B01D 2311/06* (2013.01); *B01D 2313/08* (2013.01); *B01D 2313/18* (2013.01); *B01D 2313/24* (2013.01); *B01D 2315/12* (2013.01); *B01D 2319/022* (2013.01); *B01D 2319/025* (2013.01); *B01D 2321/2008* (2013.01)
USPC ................. 210/321.74; 210/637; 210/321.83; 210/136; 210/541

(58) Field of Classification Search
None
See application file for complete search history.

(56) References Cited

U.S. PATENT DOCUMENTS

| | | | | |
|---|---|---|---|---|
| 4,517,085 A | * | 5/1985 | Driscoll et al. | ............... 210/232 |
| 4,792,401 A | | 12/1988 | Truex et al. | |
| 5,096,584 A | | 3/1992 | Reddy et al. | |
| 5,266,195 A | | 11/1993 | Hopkins | |
| 5,711,882 A | | 1/1998 | Hofmann et al. | |
| 5,817,235 A | * | 10/1998 | Tortosa | ......................... 210/232 |

(Continued)

FOREIGN PATENT DOCUMENTS

| | | |
|---|---|---|
| WO | 92/03202 | 3/1992 |
| WO | 97/06693 | 2/1997 |

(Continued)

*Primary Examiner* — Dirk Bass
(74) *Attorney, Agent, or Firm* — Hoffmann & Baron, LLP (57) ABSTRACT

The invention relates to a filter assembly for membrane filtration—of liquids, and more in particular a spiral wound filter assembly with improved filtration performance. Provided is a spiral wound filter assembly comprising a permeate channel (5; 305, 325) for transporting permeate to the permeate outlet (12), said permeate channel being provided with at least one flow restriction (13; 113, 120; 213; 333) in form of check or control valves or ridges, for increasing the pressure in at least part of the permeate channel. The invention further relates to an apparatus comprising such a filter assembly, and to methods for using this apparatus.

13 Claims, 4 Drawing Sheets

(56) References Cited

U.S. PATENT DOCUMENTS 6,709,598 B1    3/2004   Pearl
2005/0029192 A1   2/2005   Arnold et al.

FOREIGN PATENT DOCUMENTS

WO    03/055580 A1    7/2003
WO    2009/005350 A1    1/2009

* cited by examiner

SPIRAL WOUND FILTER ASSEMBLY

This application is the U.S. National Phase of, and Applicants claim priority from, International Application Number PCT/NL2008/050439 filed 30 Jun. 2008 and European Patent Application No. 07111450.8 filed 29 Jun. 2007, which are incorporated herein by reference.

BACKGROUND OF THE INVENTION

The invention relates to a filter assembly for membrane filtration of liquids, and more in particular a spiral wound filter assembly. The invention further relates to an apparatus comprising such a filter assembly, and to methods for using this apparatus.

In the last decades, the industrial application of membrane filtration techniques such as microfiltration, ultrafiltration, nanofiltration and reverse osmosis has expanded enormously. Important application areas are for instance drinking water, wastewater, biotechnology and food. Membrane filtration on an industrial scale mostly comprises cross-flow or tangential filtration, where a cross-flow of liquid is applied along the membrane surface in order to reduce membrane fouling. The opposite of cross-flow is dead-end filtration, which is most frequently applied in lab scale applications.

Membrane filters are filters that are able to separate on a molecular scale, with a maximum separation size of tens of micrometers. These membrane filters are placed in membrane modules, also called membrane units, in order to be able to incorporate them in a process system. Membrane filters and their modules are available in various models such as hollow fibres, flat sheets, tubes and spiral wound modules. An industrial membrane filtration apparatus mostly comprises a plurality of membrane modules, arranged in one or more stages.

In particular spiral wound modules have gained much importance in industrial applications. This is supposed to be due to their compact design (high ratio of membrane surface to module volume, low hold-up volume), as combined with a good overall performance. Spiral wound filter assemblies typically comprise a housing, said housing holding one or more spiral wound filter units in a filter space. The housing is equipped with a feed inlet at one end and a retentate outlet at another end. By applying a pressure drop over the feed inlet and retentate outlet, a cross-flow of liquid along the membrane is induced. The housing further comprises a permeate outlet for draining the liquid passed through the filter. A spiral wound filter unit in the housing comprises one or more membrane filter "envelopes" which are connected and sealed with their open side to a perforated permeate collecting tube. The envelopes are wrapped around the collecting tube, forming a cylindrical spiral wound filter unit. Upon filtration, the filtration liquid is fed parallel to the membrane surface and along the membrane envelope. The pressure difference over the membrane filter (=transmembrane pressure (TMP)) induces filtration of liquid through the membrane filter to the permeate flow path. At the permeate side, the permeate flows perpendicular to the feed flow through the spiral permeate flow path in the membrane envelope. After passing the spiral permeate flow path, the permeate is collected in the central permeate collecting tube and drained via the permeate outlet.

Up to now however, the application of spiral wound membranes is more or less limited to application in filtration processes that are operated at a relatively high TMP. This is due to the compact design as well: the cross-flow of liquid over the membrane consequently causes a (relatively high) pressure drop over the cross-flow channel, from the inlet of the module to the outlet of the module. As a result, the average TMP is also high. This is even more the case in industrial systems, where mostly two or more spiral wound modules are placed in series, resulting in an equivalent increase of the TMP as compared to one module.

It is well known that a good balance between (a high) cross-flow rate on the one hand and (a low) TMP on the other hand is of prominent importance for the performance of membrane filtration systems, as related to the occurrence of concentration polarisation phenomena near the membrane surface ("fouling"). For filtration liquids with a high fouling tendency, this balance is very delicate, which often means that the filtration process cannot be successful without specific measures taken in order to arrive at the desired balance.

For hollow fibre, tubule and tubular membrane systems, such measures are described in literature. An option is for instance to induce a recirculation flow along the permeate side of the membrane. When the flow resistance of the recirculation flow path is increased, for instance by filling the flow path with beads, a pressure drop between the inlet and outlet of the permeate flow path is achieved, resulting in a lower TMP (see e.g. U.S. Pat. No. 6,709,598).

For tubular modules of ceramic membranes moreover, it has been proposed to produce membranes with a decrease in thickness or an increase in porosity in the direction of the cross-flow, in order to induce a uniform flux along the flow path.

In general, these measures for a good balance between cross-flow and TMP, as proposed for hollow fibre, tubule and tubular membrane systems, are not suitable for spiral wound membranes. Firstly, because the membrane material normally is of polymeric nature, without the possibility of controlled variations in porosity or thickness. Secondly, because the specific design of spiral wound membranes does not allow for such measures.

The specific design, and more in particular the fact that the permeate side of the membrane is formed as an envelope, with an opening at one side only, clearly distinguishes spiral wound from other modules such as tubular, tubule and hollow fibre modules. It is for instance clear that it is not possible to apply a permeate recirculation flow in spiral wound modules as proposed for other modules.

SUMMARY OF THE INVENTION

It is an object of the present invention to improve the performance of spiral wound filtration systems by means of a better control of the TMP. According to the present invention, this object is achieved by providing a spiral wound filter assembly according to claim 1 of the application, and a method for treating a liquid according to claim 13.

Since the permeate flow path is provided with a flow restriction, the pressure in the part of the permeate flow path upstream the flow restriction can be increased, and therefore the TMP can be reduced along part of the membrane. Herewith, variations in the TMP along the membrane filter can be significantly reduced, providing a more constant TMP. The presence of the flow restriction also enables a lower (average) TMP than would be possible without the flow restriction. The lower and/or more constant TMP can lead to less fouling during operation and consequently a better filtration performance. The presence of the flow restriction, thus, improves filtration performance in the one or more membrane filters. It has been found that, although effective in reverse osmosis and nanofiltration, providing the more constant TMP particularly improve filtration performance in case of ultrafiltration and microfiltration.

Preferably, the at least one flow restriction is situated outside the filtration area, in the second part of the permeate channel, in one or more spiral wound filter units or between two or more filter units of the assembly. Thus, a simple construction of the filter assembly may be obtained.

Preferably, the at least one flow restriction comprises a valve, such as a check valve or a control valve. Thus, the pressure in the part of the permeate flow path upstream the valve can be predetermined, and possibly accurately be set. Therefore the TMP can be set to a predetermined value or range at the desired part of the membrane.

Preferably, the check valve is arranged to cause a substantially constant pressure drop over the check valve over a large range of fluid flow rates, e.g. from 60 to 4.000 l/hr, preferably from 60 to 8.000 l/hr, more preferably from 60 to 12.000 l/hr. Hence, the pressure in the part of the permeate flow path upstream the valve can be set and maintained accurately. The check valve may comprises a housing, a (preferably conical) poppet and or seat, wherein the poppet and/or the housing and/or the seat have shapes and/or dimensions such that, when the valve is fully opened, a cross section through the housing available for fluid flow is substantially constant along the entire axial length of the check valve.

Preferably, in case the filter assembly comprises two or more spiral wound filter units of which the permeate channels are mutually connected via an anti telescoping device, the at least one flow restriction is connected to or forms part of the anti telescoping device. Thus when replacing the filter units, the flow restriction may be maintained and reused, while allowing easy installation of the flow restriction in the filter assembly.

The invention also relates to such anti-telescoping device for use in a spiral wound filter assembly according to the invention, and comprising a flow restriction for increasing the pressure in the permeate channel upstream the flow restriction. Preferably, the flow restriction comprises a valve, such as a check valve or a control valve. Thus, the valve may be maintained and reused, while allowing easy installation of the valve in the filter assembly.

It has surprisingly been found that both placing the flow restriction in the first part of the permeate flow path, where the flow direction is essentially perpendicular to the feed flow direction, and placing the flow restriction in the second part of the permeate flow path, outside the filtration area of the spiral wound filter assembly, helps to improve the filtration performance, in spite of the complex design of the permeate flow path and the absence of a permeate recirculation flow.

Due to the reduction of the (average) TMP and/or of the variation of the TMP, while maintaining the cross-flow along the membrane filter in the feed channel for the prevention of membrane fouling, the overall performance of the spiral wound filter, and therefore the spiral wound filter assembly, can be improved.

Particular embodiments of the invention are set forth in the dependent claims.

Further aspects, effects and details of the invention are set forth in the detailed description with reference to examples of which some are shown in the schematic drawings.

MODES FOR CARRYING OUT THE INVENTION

Figure 1:
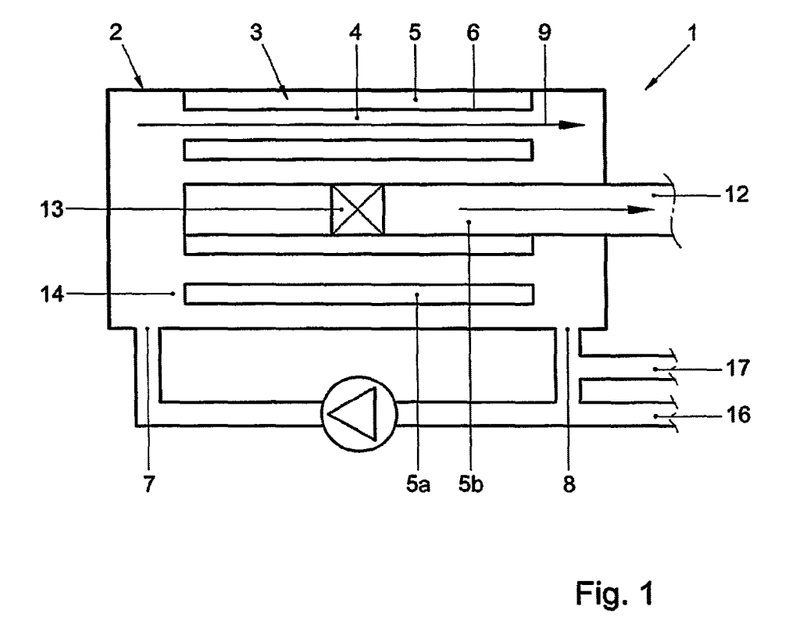
FIG. 1 is a schematic representation of a cross section of a spiral wound filter assembly according to the invention.

FIG. 1 is a schematic representation of a cross section of a spiral wound filter assembly 1 according to the invention.

The spiral wound filter assembly 1 comprises a housing 2 having a filter space 14 holding a spiral wound filter unit 3. Such a filter assembly can be part of a filtration apparatus or filtration plant for the processing of liquids. The housing 2 of the filter assembly 1 comprises a feed inlet 7 at one end of the filter space 14, and a retentate outlet 8 at the other end of the filter space 14 for feeding a liquid through the filter space 14 in a feed flow direction 9 from the feed inlet 7 to the retentate outlet 8. In this example, a single permeate outlet 12 is provided for draining permeate from the filter space.

In the spiral wound filter assembly shown in FIG. 1, the retentate outlet 8 is connected with the feed inlet 7 via a recirculation loop and a pump for circulating the liquid to be treated. Liquid to be filtered in the filter assembly 1 can be added to the recirculation loop via a feed inlet channel 16, and retentate can be drained from the recirculation loop via a retentate outlet channel 17.

The spiral wound filter is preferably part of a larger apparatus for the processing of liquids. Apparatus comprising spiral wound filter assemblies for liquid filtration are known to a person skilled in the art and are therefore not elaborated in this text.

Figure 2:
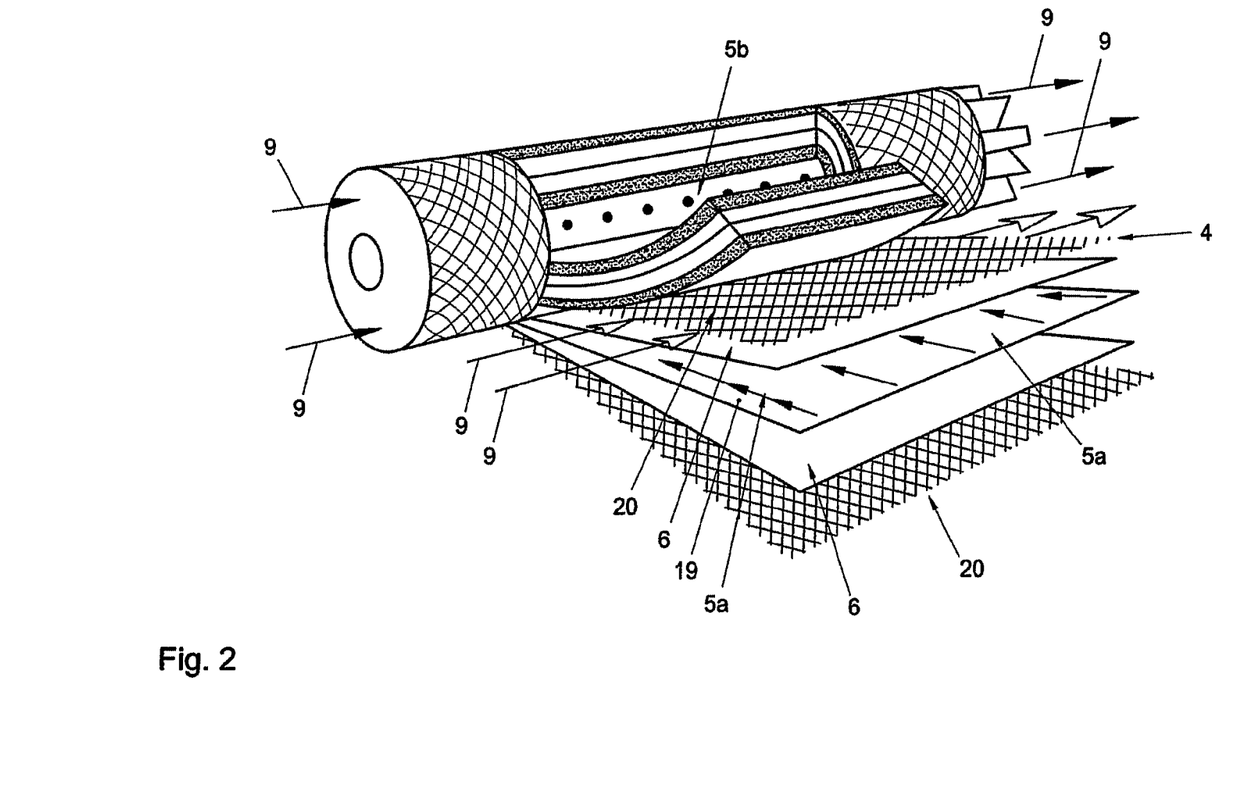
FIG. 2 is a schematic view in perspective of part of a spiral wound filter unit.

FIG. 2 shows the spiral wound filter unit 3 in more detail. The spiral wound filter unit typically comprises a permeate channel 5, comprising, in this example consisting of, a spiral flow path in the membrane "envelope" 5a, and a permeate collecting tube 5b.

Each of the so-called envelopes 5a contains two layers of membrane 6 separated by a permeate channel spacer 19. The two layers of membrane 6 with the permeate channel spacer 19 between them are sealed at three sides to form a membrane envelope 5a. The permeate channel spacer 19 allows the permeate to flow through the membrane envelope 5a.

Each envelope 5a is connected and sealed with its open end to openings in the collecting tube 5b. When the filter is part of the spiral wound filter assembly 1 in FIG. 1, the permeate collecting tube 5b is connected to the permeate outlet 12.

In order to form a compact spiral wound filter unit, the envelope 5a is wound around the collecting tube 5b. The feed liquid is transported along the envelope through feed channels 4.

A feed channel spacer 20, in this example consisting of plastic netting material, is placed in the feed channel. The feed spacers are often designed such that they act as turbulence promotors as well. In general, this is beneficial for the prevention of membrane fouling. When the spiral wound filter unit 3 is part of the spiral wound filter assembly, the feed channels 4 extend between the feed inlet 7 and the retentate outlet 8 in the filter space 14. The filtration liquid is fed to the filter in a flow direction 9 parallel to the membrane filters.

In an embodiment of the invention, the at least one flow restriction is situated outside the filtration area, in the second part of the permeate channel, in one or more spiral wound filter units or between two or more filter units of the assembly. In the spiral wound filter assembly in FIG. 1, a flow restriction 13 is placed in the permeate collecting tube 5b of the permeate channel 5 in order to increase the pressure in the section of the permeate channel upstream of the flow restriction. One or more standardized valves can be applied as flow restriction. In FIG. 1 for instance, the flow restriction consists of a valve with a binary control (open or closed) that opens at a pressure difference over the valve of 1 bar. The valve in the example of FIG. 1, thus, constitutes a check valve, which opens at a predetermined pressure difference over the valve.

It will be appreciated that the (relative) pressure in the section of the permeate channel upstream of the overpressure valve can easily be set by selecting or adjusting the pressure difference at which the valve opens.

In a further embodiment the valve can be a control valve, for example connected with a control unit. It will be appreciated that the control valve may fully or partially open or close in response to a signal received from the control unit. The control unit may compare a desired parameter value, such as a desired pressure value in the permeate channel 5 or filter space 14, to a measured parameter value, such a measured pressure value in the permeate channel 5 or filter space 14. In this way, the valve settings can be adjusted during the process, for instance to correct for pressure changes during the process. Alternatively, a flow restriction can also be achieved by a local reduction of the diameter of the flow channel.

In the filter assembly of FIG. 1, a system with one flow restriction is shown as an example. If desired, multiple flow restrictions can be applied. As an example, two pressure valves can be present, both with a binary control and opening e.g. at a pressure of 0.5 bar. One valve can for example be placed at about a quarter and the other for example at about three quarters of the length of the permeate collecting tube.

In another embodiment according to the invention, the spiral permeate flow path in the membrane envelope, i.e. the first part 5a of the permeate channel 5, is provided with a flow restriction, for example in the form of a ridge in the permeate spacer material 19. The ridge can be designed such that during filtration, two different pressure zones are present in the first part of the permeate channel.

Figure 3:
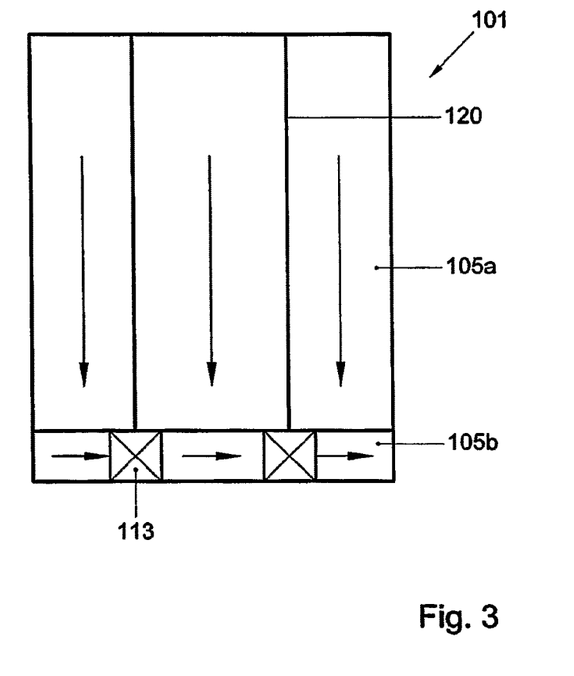
FIG. 3 is a schematic representation of a cross section of part of a spiral wound filter unit according to the invention.

FIG. 3 is a schematic representation of part of a spiral wound filter unit 103 according to the invention. For clarity reasons, the unit is shown with an envelope in an unwound fashion. The first part of the permeate channel in the membrane envelope is numbered 105a and the second part 105b. In the first part of the permeate channel, flow restrictions in the form of ridges (120) in the permeate spacer material are provided, running parallel to the permeate flow direction and extending from the closed side of the envelope 105a to the opened side that is connected to the permeate collecting tube 105b. In addition to the ridges, two extra flow restrictions (113), e.g. in the form of valves, are provided in the second part of the permeate channel. The valves can be located at the position in the permeate collecting tube where the ridges contact this tube. In this way, the permeate channel is segmented in pressure zones. Alternatively, the ridges may for example run at an angle to the position shown, not extend to the sides of the envelope or tube part of the permeate channel, etc.

In a further preferred embodiment, the at least one flow restriction is placed at the transition from the first part into the second part of the permeate channel. For example, the permeate collecting tube can contain a flow restriction in the form of perforations. When the permeate collecting tube is perforated in such a way that the diameter of the perforations varies from relatively small near the inlet to relatively wide near the outlet, a pressure gradient can be achieved in the first part of the permeate channel. This pressure gradient can lead to a lower TMP and as such be helpful in the prevention of fouling.

Figure 4:
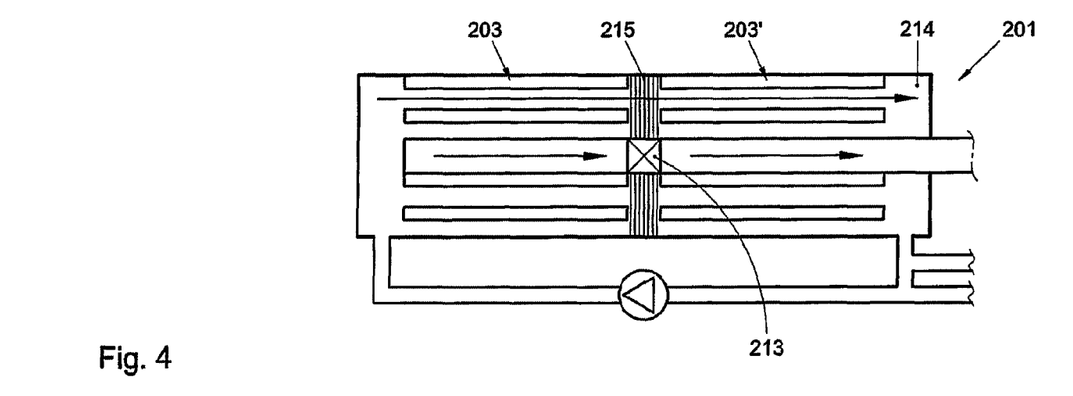
FIG. 4 is a schematic representation of a cross section of an alternative spiral wound filter assembly according to the invention.

In the exemplary embodiment of FIG. 4, a spiral wound filter assembly 201 is shown with a filter holding space 214 holding 2 filter units 203, 203'. Placing multiple spiral wound filters in series in the filter space can be advantageous because of economical reasons (less pump capacity and/or less housing material required). However, a higher pressure drop over the feed channel is needed because of the increased resistance of the extended feed channel.

The two filter units 203, 203' are separated by an anti telescoping device (ATD) 215. An ATD is typically a wheel shaped device with a tubular axis and spokes that radially extend from the tubular axis. The tubular axis connects the permeate channel from the upstream filter unit with the permeate channel of the downstream filter unit. The tubular axis thus forms a fluid flow path extending through the anti telescoping device along a central axis thereof. In this example the spiral wound filter assembly 201 is provided with a single permeate outlet. The spokes prevent extension of the upstream membrane roll, while at the same time allowing the retentate to flow freely from the upstream filter unit to the downstream filter unit.

The upstream spiral-wound filter unit 203' is equipped with an anti-telescoping device at the downstream end of the membrane elements in order to prevent extension of the membrane roll. In a preferred embodiment, shown in FIG. 4, the ATD 215 is provided with a flow restriction 213. Therewith, the flow restriction is placed in between two filter units and the pressure in the upstream spiral wound unit 203 can be increased, and the TMP can be lowered. This is a relatively simple way of providing the permeate channel of a spiral wound filter assembly with a flow restriction. Such an ATD can both be used in combination with conventional spiral wound filters without a flow restriction, and in combination with spiral wound filters that already have flow restrictions in their permeate channel. Another advantage of placing a flow restriction in an ATD is that normally, an ATD has a longer lifetime than a spiral wound filter unit. Thus it is economically more attractive to place a flow restriction in an ATD. In a preferred embodiment, the ATD is provided with a valve, such as a check valve or preferably a control valve. The valve may be designed as the valve with a binary control (open or closed) that opens at a pressure difference over the valve of e.g. between 0.05 and 10 bar, preferably between 0.1 and 5 bar, such as at 1 bar, at a permeate flow rate of between 60 to 12.000 l/hr. The valve, thus, constitutes a check valve, which opens at a predetermined pressure difference over the valve. It will be appreciated that the valve can be a control valve, for example connected with a control unit, as described hereinabove.

Figure 5:
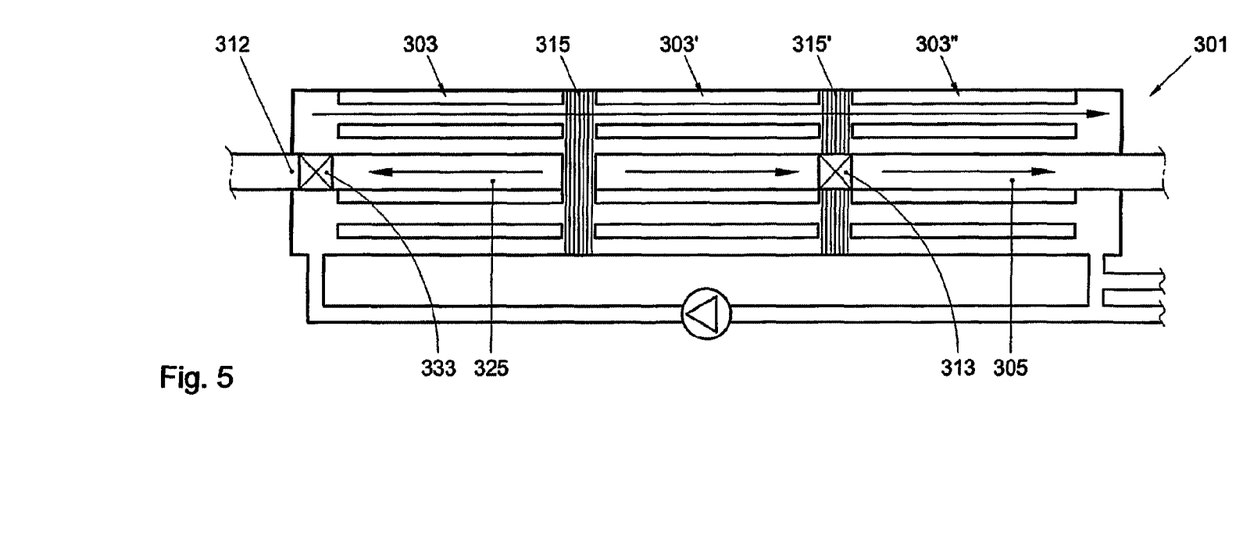
FIG. 5 is a schematic representation of a cross section of a further alternative spiral wound filter assembly according to the invention.

If the flow restriction is designed as the check valve, it is desired that the valve opens at substantially the same pressure difference over the valve over a large range of fluid flow rates through the check valve. The valve, thus, generates substantially the same pressure drop over the valve over a large range of fluid flow rates, e.g. from 60 to 4.000 l/hr, preferably from 60 to 8.000 l/hr, more preferably from 60 to 12.000 l/hr. Check valves commonly comprise a housing containing a poppet, a seat and a spring forcing the poppet against the seat with a predetermined force. In a preferred embodiment, the check valve is designed such that the poppet and/or the housing and/or seat have shapes and/or dimensions such that, when the valve is fully opened, the cross section available for fluid flow is substantially constant along the entire axial length of the check valve. FIG. 5 shows yet another example, wherein two or more filter units are provided in one housing, and each having a permeate outlet. FIG. 5 shows a spiral wound filter assembly 301 comprising three spiral wound filter units 303, 303', 303", separated by a first and second ATD 315, 315'. The two downstream filter units 303', 303" have a permeate channel 305 that is mutually connected via an ATD 315', holding a flow restriction 313. The ATD 315' may e.g. be designed as the ATD 215 described with respect to FIG. 4. The upstream spiral wound filter unit 303 has a separate permeate channel 325 holding a flow restriction 333. By providing the spiral wound filter unit 303 with a separate outlet 312 and flow restriction 333, the flow restriction can for example be placed outside the filter space, and is thus more accessible for maintenance etc. In a system as presented in FIG. 5 moreover, the filtration process can be more robust since the process performance is less dependent on the performance of one single flow restriction.

The objective of the flow restriction is to maintain a pressure difference over the flow restriction during filtration. The height of the pressure difference depends highly on the design of the filtration system and the filtration conditions. In general, the flow restriction is designed such that it induces a pressure difference over the flow restriction between 0.05 and 10 bar, preferably between 0.1 and 5 bar, preferably at a permeate flow rate of between 60 and 12.000 l/hr.

In a method for membrane filtration of liquids, a spiral wound filter assembly comprising a membrane filter, separating a feed channel from a permeate channel, and a permeate outlet, is used.

A pressure difference is provided over the feed side of the membrane filter for feeding the liquid through the feed channel along a feed flow path in a feed flow direction. Over the membrane filter, a transmembrane pressure is provided such that the pressure is higher at the feed side than at the permeate side. The transmembrane pressure induces transport of liquid through the membrane filter to the permeate side. The permeate is transported via the permeate channel to the permeate outlet. A flow restriction is provided such that the pressure in at least part of the permeate channel is increased, and the maximum pressure difference along the membrane filter is reduced.

In a preferred method a spiral wound filter assembly according to the invention is used, preferably an apparatus provided with such an assembly.

Preferred filtration fluids are fluids with a high fouling tendency such as milk products, food products, fruit juices, beverages such as beer, waste water, fermentation broths, biotechnological and pharmaceutical fluids.

From the foregoing, it will be clear to the skilled person, that within the framework of the invention as set forth in the claims many variations other than the examples described above are conceivable. For instance, a spiral wound filter assembly comprising multiple filter spaces with spiral wound filter units, mutually connected either via the feed channels and/or permeate channels or with separate feed channels and/or permeate channels.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A spiral wound filter assembly for membrane filtration of liquids, comprising;
 a housing holding two or more spiral wound filter units in a filter space,
 a feed inlet at one end of the filter space, and a retentate outlet at the other end of the filter space, for feeding a liquid through the filter space in a feed flow direction from the feed inlet to the retentate outlet,
 at least one permeate outlet for draining permeate from the filter space, and wherein each of said two or more spiral wound filter units comprises:
 a membrane filter separating a feed channel from at least one permeate channel, wherein
 the feed channel extends between the feed inlet and the retentate outlet for transporting a liquid along a feed flow path parallel to the membrane filter in the feed flow direction, and
 the at least one permeate channel, for transporting permeate to the permeate outlet, comprises:
 a first part extending between the feed inlet and the retentate outlet for transporting permeate along a first permeate flow path in a direction perpendicular to the feed flow direction,
 a second part for transporting permeate along a second permeate flow path in a direction parallel to the feed flow direction, to the permeate outlet, wherein the permeate channels of the two or more spiral wound filter units are mutually connected via an anti-telescoping device, and wherein
 the at least one permeate channel is provided with at least one flow restriction, for increasing the pressure in the section of the permeate channel upstream of the at least one flow restriction, wherein one of the at least one flow restriction comprises a check valve forming part of the anti-telescoping device, and wherein the permeate outlet flow from the housing is decreased.

2. The spiral wound filter assembly according to claim 1, wherein the check valve is arranged to cause a substantially constant pressure drop over a range of fluid flow rates from 60 to 4,000 l/hr.

3. The spiral wound filter assembly according to claim 1, wherein said first part of the permeate channel is provided with at least one flow restriction, resulting in at least two separate pressure zones.

4. The spiral wound filter assembly according to claim 3, wherein the membrane filter comprises two layers of membrane disposed on opposite sides of a permeate spacer, wherein the at least one flow restriction comprises a ridge in the permeate spacer.

5. The spiral wound filter assembly according to claim 1, wherein the flow restriction is designed such that it induces a pressure difference over the flow restriction between 0.05 and 10 bar, at a permeate flow rate of between 60 to 12,000 l/hr.

6. The spiral wound filter assembly according to claim 1, wherein the anti-telescoping device further comprises a flow restriction in the form of a second check valve for increasing the pressure in the permeate channel upstream of the at least one flow restriction.

7. The spiral wound filter assembly according to claim 6, wherein at least one flow restriction forms a fluid flow path extending through the anti-telescoping device along a central axis thereof.

8. The spiral wound filter assembly according to claim 6, wherein at least one of said check valves are arranged to cause a substantially constant pressure drop over the valve over a range of fluid flow rates from 60 to 4,000 l/hr.

9. The spiral wound filter assembly according to claim 1, wherein the valve is arranged to cause a substantially constant pressure drop over the valve over a range of fluid flow rates from 60 to 8,000 l/hr.

10. The spiral wound filter assembly according to claim 1, wherein the valve is arranged to cause a substantially constant pressure drop over the valve over a range of fluid flow rates from 60 to 12,000 l/hr.

11. The spiral wound filter assembly according to claim 1, wherein the flow restriction is designed such that it induces a pressure difference over the flow restriction between 0.1 and 5 bar at a permeate flow rate of between 60 to 12,000 l/hr.

12. The spiral wound filter assembly according to claim 6, wherein at least one of said check valves are arranged to cause a substantially constant pressure drop over the valve over a range of fluid flow rates from 60 to 8,000 l/hr.

13. The spiral wound filter assembly according to claim 6, wherein at least one of said check valves are arranged to cause a substantially constant pressure drop over the valve over a range of fluid flow rates from 60 to 12,000 l/hr.

\* \* \* \* \*